June 20, 1933. H. F. HOWARD 1,914,507
DOWEL PIN
Filed Aug. 15, 1932  2 Sheets-Sheet 2

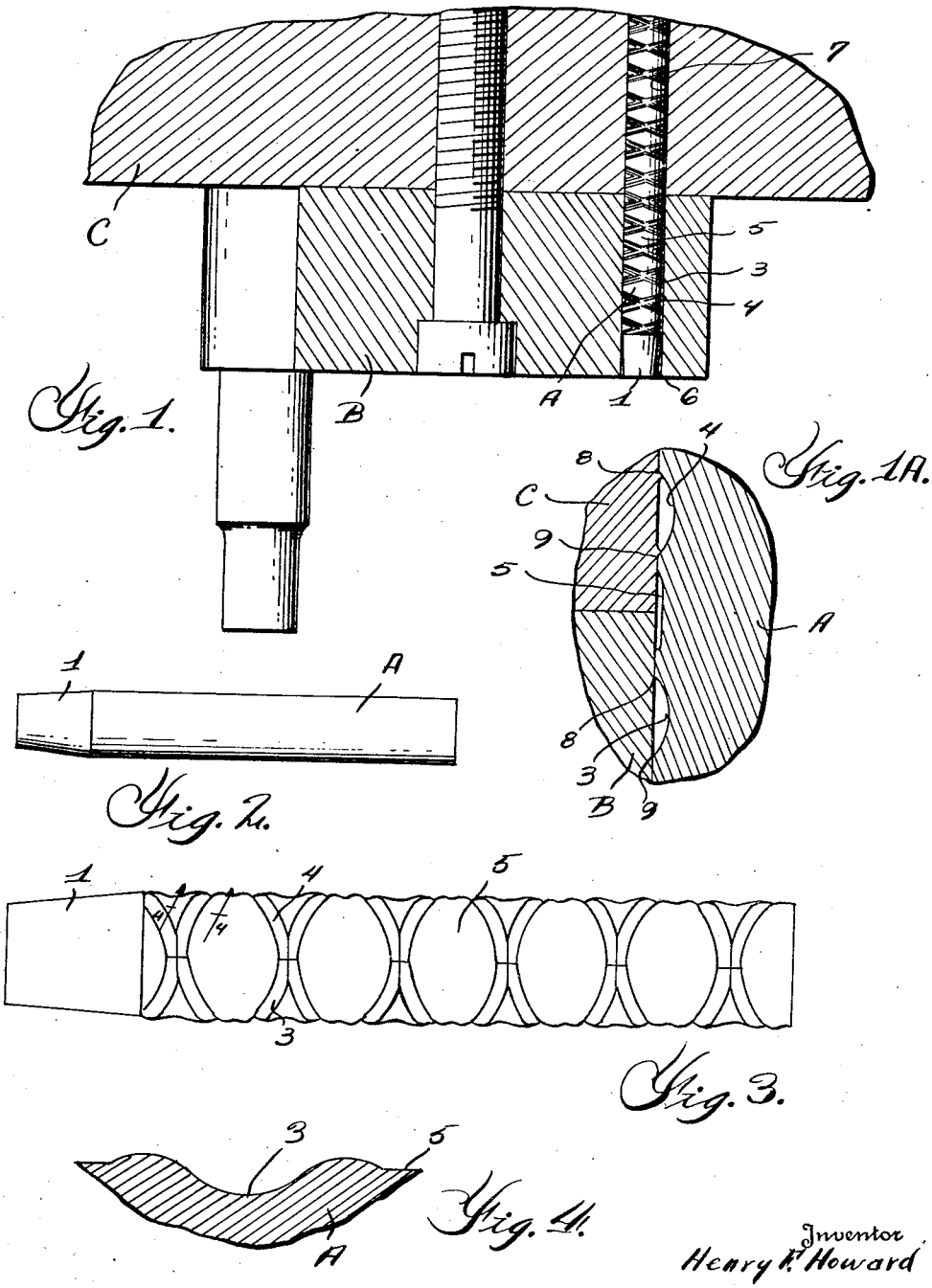

Inventor
Henry F. Howard

Patented June 20, 1933

1,914,507

UNITED STATES PATENT OFFICE

HENRY F. HOWARD, OF DETROIT, MICHIGAN, ASSIGNOR TO WHITMAN & BARNES, INCORPORATED, OF DETROIT, MICHIGAN, A CORPORATION OF MICHIGAN

DOWEL PIN

Application filed August 15, 1932. Serial No. 628,918.

This invention relates generally to dowel pins and consists of certain novel features of construction that will be hereinafter more fully described and particularly pointed out in the appended claims.

In the accompanying drawings:

Figure 1 is a vertical sectional view through a punch press head and tool retainer body and showing a dowel pin embodying my invention applied thereto;

Figure 1A is an enlargement of a portion of Figure 1;

Figure 2 is an elevation of the blank from which the pin is formed after opposite ends of the cylindrical body of low carbon steel have been tapered;

Figure 3 is a view of the pin after the grooves have been formed in the structure illustrated in Figure 2;

Figure 4 is a sectional view taken on the line 4—4 of Figure 3;

Figure 7:
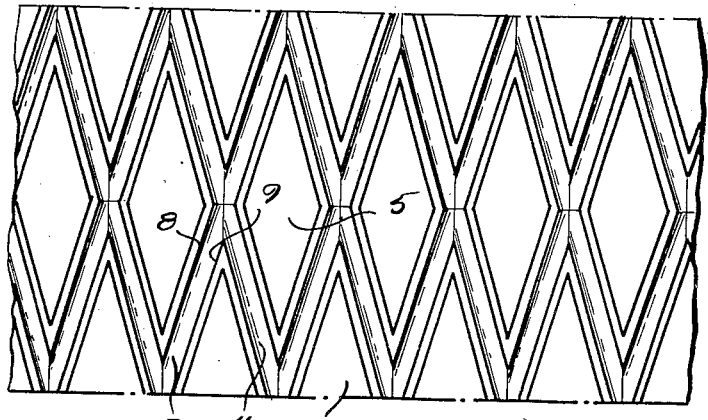
Figure 7 is a diagrammatic view of the peripheral portion of the dowel pin brought into a horizontal plane.
Figure 5:
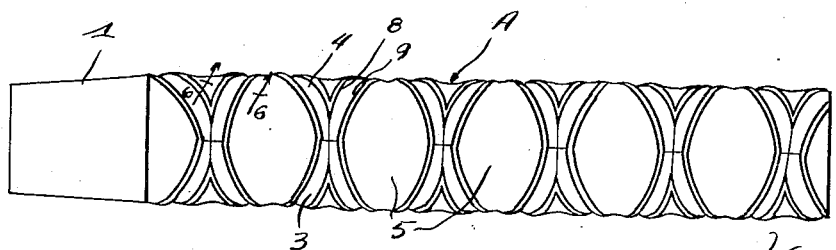
Figure 5 is an elevation of the construction illustrated in Figure 3 after the grinding operation.
Figure 6:
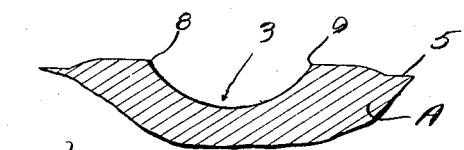
Figure 6 is a sectional view taken on the line 6—6 of Figure 5.

Referring now to the drawings wherein I have illustrated one embodiment of my invention, the dowel pin preferably comprises a cylindrical body A having a tapered end 1 and provided from said end to its opposite end with crossed spiral grooves 3 and 4 respectively and intermediate substantially diamond shaped relief portions 5.

In the process of construction, a cylindrical body of low carbon steel is initially provided and is tapered at one end as shown. A rolling operation similar to that employed for making screw threads is then employed for making the grooves 3 and 4. The relief portions 5 are formed as a result of this rolling operation. Following the groove forming operation the body is then heat treated and is subsequently centerless ground to provide the finished article.

In use, a dowel pin such as that described herein may be employed wherever desired to hold adjacent or abutting pieces in proper relation to each other. However, for the purpose of illustration I have shown the dowel in the body B of a punch retainer and in the ram or head C of the punch press to which such body B is bolted. To apply the dowel it is merely necessary to drill in the body B and head C holes 6 and 7 respectively that are .005 to .007 inches smaller in diameter and to drive the dowel into said holes. Usually the body B of the retainer is hardened steel, consequently the edges 8 and 9 respectively of the grooves will be flattened somewhat into the relief portions 5 insuring a tight fit of the dowel in said body, and the head C is a casting, consequently the edges 8 and 9 will remain intact and the metal of such casting will be sheared by said edges and will flow into the grooves 3 and 4. Thus it will be observed that the edges 8 and 9 of the grooves constitute cutters to produce a shearing action. As a result the dowel pin will shear itself to a tight fit in the head C. In this connection it will be noted that the provision of the crossed right and left hand grooves 3 and 4 will insure simultaneous and centralized action. The grooves 3 and 4 also constitute outlets for air in the holes when inserted therein and provide chip spaces and passages for lubricant when lubricant is used. Due to the spiral formation of the grooves, the chips will move longitudinally of the grooves upon insertion of the dowel into the hole 6. The crossed formation of the grooves will insure such chips being divided, consequently resistance is minimized. The relief portions 5 lessen friction and the pressure required for forcing the dowel into the holes. Such relief portions also provide clearance for the edges of the grooves when the dowel is driven into hardened metal such as into the hole 7 in the body B and serve as pockets for lubricant when such is used.

Thus from the foregoing it will be apparent that I have provided an extremely practical and efficient dowel pin and that due to the construction thereof it is unnecessary to ream or otherwise fashion the holes for the dowel before insertion thereof as in the past. Moreover there is no spalling or building up of the metal that is common with plain dowel pins.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A dowel pin comprising a substantially cylindrical body having grooves constituting outlets for air in holes in which the pin is inserted, having cutting edges at opposite sides of said grooves, and having relief portions adjacent said cutting edges.

2. A dowel pin comprising a substantially cylindrical body having intersecting right and left hand spiral grooves extending longitudinally thereof with the points of intersection in lines disposed at substantially diametrically opposite sides and extending longitudinally of said body, the edges of said grooves forming cutters to produce a shearing action.

3. A dowel pin comprising a substantially cylindrical body having intersecting right and left hand spiral grooves extending longitudinally thereof, and having substantially diamond-shaped relief portions between the points of intersection and bounded by said grooves.

4. A dowel pin comprising a substantially cylindrical body having a tapered end, having intersecting right and left hand spiral grooves extending longitudinally thereof from said tapered end, and having substantially diamond-shaped relief portions between the points of intersection and bounded by said grooves.

5. A dowel pin comprising a substantially cylindrical body having two longitudinally extending rows of substantially diamond-shaped relief portions, said rows being at substantially diametrically opposite sides of said body, and right and left hand spiral grooves extending longitudinally of said body and crossing one another between said relief portions at points substantially coinciding with the longitudinally median lines of said rows.

6. A dowel pin comprising a substantially cylindrical body having right and left hand spiral grooves extending longitudinally thereof and constituting outlets for air in a hole in which the pin is inserted and providing continuous passages for chips and for a lubricant when a lubricant is used, the edges of said grooves forming cutters to produce a shearing action, said grooves crossing one another at substantially diametrically opposite sides of the body whereby the shearing action aforesaid is centralized upon insertion of the pin into such hole.

In testimony whereof I affix my signature.

HENRY F. HOWARD.